(12) United States Patent
Fujita et al.

(10) Patent No.: US 9,752,002 B2
(45) Date of Patent: Sep. 5, 2017

(54) FIBER-REINFORCED THERMOPLASTIC RESIN PREPREG, MOLDED BODY OF SAME, AND METHOD FOR PRODUCING FIBER-REINFORCED THERMOPLASTIC RESIN PREPREG

(71) Applicant: Mitsubishi Rayon Co., Ltd., Chiyoda-ku (JP)

(72) Inventors: Saki Fujita, Toyohashi (JP); Tadashi Ohtani, Toyohashi (JP); Atsushi Takahashi, Toyohashi (JP); Kiyotoshi Fujioka, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/443,860

(22) PCT Filed: Nov. 26, 2013

(86) PCT No.: PCT/JP2013/081718
§ 371 (c)(1),
(2) Date: May 19, 2015

(87) PCT Pub. No.: WO2014/084194
PCT Pub. Date: Jun. 5, 2014

(65) Prior Publication Data
US 2016/0009881 A1 Jan. 14, 2016

(30) Foreign Application Priority Data

Nov. 27, 2012 (JP) .................................. 2012-258443
Aug. 7, 2013 (JP) .................................. 2013-164310

(51) Int. Cl.
| | | |
|---|---|---|
| B32B 37/08 | (2006.01) |
| B32B 37/10 | (2006.01) |
| B32B 27/34 | (2006.01) |
| B32B 37/06 | (2006.01) |
| C08J 5/04 | (2006.01) |
| C08J 5/06 | (2006.01) |
| C08J 5/24 | (2006.01) |
| B32B 27/08 | (2006.01) |
| C08K 5/053 | (2006.01) |
| C08K 7/06 | (2006.01) |

(52) U.S. Cl.
CPC ............... *C08J 5/24* (2013.01); *B32B 27/08* (2013.01); *B32B 27/34* (2013.01); *B32B 37/06* (2013.01); *B32B 37/08* (2013.01); *B32B 37/10* (2013.01); *C08J 5/042* (2013.01); *C08J 5/06* (2013.01); *C08K 5/053* (2013.01); *C08K 7/06* (2013.01); *B32B 2262/101* (2013.01); *B32B 2262/106* (2013.01); *B32B 2305/076* (2013.01); *C08J 2377/00* (2013.01); *C08J 2377/02* (2013.01); *C08J 2463/00* (2013.01); *C08J 2463/02* (2013.01); *C08J 2475/16* (2013.01)

(58) Field of Classification Search
CPC ............... B32B 27/34; B32B 2377/00; B32B 17/10724; B32B 2262/106; B32B 2262/101; C08G 69/00; C08G 69/02; C08G 69/04; C08G 69/06; C08G 69/081; C08G 69/12; C08G 69/14; C08G 69/16; C08G 69/18; C08G 69/20; C08G 69/22; C08G 69/24; C08G 69/26; C08G 69/265; C08G 69/28; C08G 69/30; C08G 69/32; C08G 69/34; C08G 69/36; C08G 69/38; C08G 69/40; C08G 69/42; C08G 69/44; C08G 69/46; C08G 69/48; C08G 69/50; C08J 2377/00; C08J 2377/02; C08J 2377/04; C08J 2377/06; C08J 2377/08; C08J 2377/10; C08J 2377/12; C08J 2477/00; C08J 2477/02; C08J 2477/04; C08J 2477/06; C08J 2477/08; C08J 2477/10; C08J 2477/12; C08L 77/00; C08L 77/02; C08L 77/04; C08L 77/06; C08L 77/08; C08L 77/10; C08L 77/12
USPC ....... 442/158, 262, 266, 331, 355, 367, 179, 442/265, 354; 428/474.4–479.6, 299.4, 428/299.1
See application file for complete search history.

(56) References Cited

FOREIGN PATENT DOCUMENTS

| | | |
|---|---|---|
| EP | 1403420 A1 | 3/2004 |
| JP | 61-066616 A | 4/1986 |
| JP | 01-272867 A | 10/1989 |
| JP | 2685221 B2 * | 12/1997 |
| JP | 2002-371141 A | 12/2002 |
| JP | 2009-286817 A | 12/2009 |
| JP | 2011-174057 A | 9/2011 |
| JP | 2012-057277 A | 3/2012 |
| JP | 4894982 B1 | 3/2012 |

(Continued)

OTHER PUBLICATIONS

BASF, Product Information-Ultramid B27 E01; Aug. 2015.*

(Continued)

*Primary Examiner* — Frank Vineis
(74) *Attorney, Agent, or Firm* — Morgan, Lewis & Bockius LLP

(57) ABSTRACT

A fiber-reinforced thermoplastic resin prepreg containing (A) reinforcing fibers, (B) a sizing agent and (C) a polyamide resin is described, wherein the sizing agent (B) and the polyamide resin (C) satisfy the condition $N_m/N_0<4.0$, wherein $N_0$ is the average of torques necessary for maintaining the number of revolutions of a roller type blade at 100 rpm/15 minutes.

6 Claims, No Drawings

(56) References Cited

FOREIGN PATENT DOCUMENTS

JP         2012-097383 A     5/2012
WO       02/099180 A1    12/2002

OTHER PUBLICATIONS

Yoneyama et al., Press Forming of Carbon-Fiber-Reinforced Thermoplastic Sheets, Journal of the JSTP, vol. 53, No. 613 (2012-2) pp. 55-59.
International Search Report dated Feb. 25, 2014, for International application No. PCT/JP2013/081718.

\* cited by examiner

FIBER-REINFORCED THERMOPLASTIC RESIN PREPREG, MOLDED BODY OF SAME, AND METHOD FOR PRODUCING FIBER-REINFORCED THERMOPLASTIC RESIN PREPREG

TECHNICAL FIELD

The present invention relates to a fiber-reinforced thermoplastic resin prepreg which has light weight and excellent strength and rigidity, a molded body obtained by laminating the fiber-reinforced thermoplastic resin prepreg, and a method for producing the fiber-reinforced thermoplastic resin prepreg.

The disclosures in Japanese Patent Application No. 2012-258443 which has been filed in Japan on Nov. 27, 2012 and Japanese Patent Application No. 2013-164310 which has been filed in Japan on Aug. 7, 2013, from which this application claims priority, are incorporated herein by reference.

BACKGROUND ART

Recently, a reinforcing fiber material is composited with various matrix resins, and fiber-reinforced plastics obtained therefrom are widely used for various fields and applications. In particular, in an aerospace field or a general industry field in which high mechanical characteristics, heat resistance, or the like are required, a thermosetting resin like an unsaturated polyester resin, an epoxy resin, and a polyimide resin has been conventionally used as a matrix resin. However, particularly in an aerospace field, such a matrix resin has a problem of poor impact resistance due to brittleness, and thus an improvement is needed therefor. Further, in the case of a thermosetting resin, when a prepreg is prepared by using it, there are problems relating to storage and management due to short resin lifetime, and also insufficient follow-up capability to a product shape and low productivity caused by long molding time.

On the other hand, when a prepreg is prepared by using a thermoplastic resin, the impact resistance is excellent if it is provided as a composite material and storage and management of a prepreg is easy and cost for molding may be saved due to short molding time.

For improving the mechanical characteristics of a molded body in which a thermoplastic resin prepreg is used, there is a method of increasing interface contact between reinforcing fibers and a thermoplastic resin during impregnating a thermoplastic resin in continuous reinforcing fibers in the process of producing a molding material, and as a result, dynamic properties of a molded body are eventually improved. For example, there is a method of providing a reactive functional group by performing a surface oxidation treatment of reinforcing fibers, thereby improving adhesiveness between the reinforcing fibers and a thermoplastic resin. However, in such a case, when a surface treatment amount of reinforcing fibers is high, the strength of reinforcing fibers itself is impaired, causing a problem that dynamic properties of a molded body are affected. Accordingly, a method of adding a component for enhancing adhesiveness other than reinforcing fibers and a thermoplastic resin is tried. Regarding a component for enhancing adhesiveness, a method has been suggested in which an epoxy compound having high affinity for reinforcing fibers and reactivity with a thermoplastic resin is used (see, Patent Document 1). There has been also an attempt to improve adhesiveness to a polyamide resin by using a reaction product between an epoxy compound and a hydroxy group-containing amine compound as a sizing agent (see, Patent Document 2). However, in such a case, as the sizing agent has good affinity for reinforcing fibers but also has reactivity with a thermoplastic resin, the impregnation property of a thermoplastic resin into continuous fibers is not sufficient in accordance with an increase in viscosity of a matrix resin. For such reasons, there is a high possibility that tiny voids remain during manufacture of a prepreg. Furthermore, a molded body using a prepreg is generally molded by press molding or the like, but there is a limit of pressure capable of suppressing resin flow or fiber meandering. For such reasons, there is a possibility that tiny voids derived from a prepreg remain in a molded body which has been molded at such pressure, and thus a problem arises that a molded body having excellent dynamic properties cannot be obtained. Furthermore, although there is an example that a sizing agent with excellent impregnation property is added, it is an example only relating to a thermoplastic resin with low viscosity and no determination is made regarding a thermoplastic resin with high viscosity (see, Patent Document 3). Taken together, in a current state, a sizing agent having affinity for both of reinforcing fibers and thermoplastic resin and also satisfying the impregnation property of a thermoplastic resin into reinforcing fibers have not been known.

CITATION LIST

Patent Document

Patent Document 1: JP 4894982 B
Patent Document 2: JP 2012-97383 A
Patent Document 3: JP 1-272867 A

SUMMARY OF THE INVENTION

Problem to be Solved by the Invention

The present invention is devised under the circumstances described above, and an object of the present invention is to provide a fiber-reinforced thermoplastic resin prepreg having excellent dynamic properties as the thermoplastic resin has an excellent impregnation property into reinforcing fibers, a molded body obtained by laminating the fiber-reinforced thermoplastic resin prepreg, and a method for producing the fiber-reinforced thermoplastic resin prepreg.

Means for Solving Problem

The inventors of the present invention conducted intensive studies to solve the aforementioned problems. As a result, they found that, by using a combination of reinforcing fibers, a sizing agent, and a polyamide resin which satisfy specific conditions, the impregnation property of a thermoplastic resin into the reinforcing fibers is enhanced, and thus a composition enabling a molded body with excellent dynamic properties can be obtained. The present invention is completed accordingly.

Specifically, the present invention relates to the followings.

[1] A fiber-reinforced thermoplastic resin prepreg containing [A] reinforcing fibers, [B] a sizing agent, and [C] polyamide resin, in which [B] the sizing agent and [C] the polyamide resin satisfy the following conditions.

$$N_m/N_0 < 4.0$$

$N_0$ is an average of torques of a roller type blade required for maintaining the number of revolutions of a roller type blade at 100 rpm for 15 minutes, the average representing the fluidity of [C] the polyamide resin in cases where a mixer having a volume of 60 cc and a roller type blade is used, only [C] the polyamide resin is filled into the mixer such that the filling ratio is 60% relative to the volume of the mixer, and the resin is heated and melted at a temperature that is higher than the melting point of [C] the polyamide resin by 30° C., and $N_m$ is an average of torques of a roller type blade required for maintaining the number of revolutions of a roller type blade at 100 rpm for 15 minutes, the average representing the fluidity of a mixture which is obtained by using a mixer having a volume of 60 cc and a roller type blade, filling the mixer with a mixture, in which [B] the sizing agent and [C] the polyamide resin are mixed at 3:100 (mass ratio), such that the filling ratio is 60% relative to the volume of the mixer, and heating and melting the mixture at a temperature that is higher than the melting point of [C] the polyamide resin by 30° C.

[2] The fiber-reinforced thermoplastic resin prepreg described in [1], in which a complex viscosity of [C] the polyamide resin is 30 to 250 Pa·s under the following measurement conditions.

<Measurement Conditions>

The complex viscosity measured at a temperature that is higher than the melting point of [C] the polyamide resin by 30° C., an angular frequency of 0.1 rad/s, and a displacement of 20% by dynamic viscoelasticity measurement using a rotary viscometer, in which a parallel plate is used, is defined as melt viscosity.

[3] The fiber-reinforced thermoplastic resin prepreg described in [1] or [2], in which [A] the reinforcing fibers contained in the fiber-reinforced thermoplastic resin prepreg are 15 to 80% by mass relative to the total mass of the fiber-reinforced thermoplastic resin prepreg, [B] the sizing agent is 0.01 to 2% by mass relative to the total mass of the fiber-reinforced thermoplastic resin prepreg, [C] the polyamide resin is 18 to 85% by mass relative to the total mass of the fiber-reinforced thermoplastic resin prepreg, and the total amount of each component is not more than 100% by mass.

[4] The fiber-reinforced thermoplastic resin prepreg described in any one of [1] to [3], in which [A] the reinforcing fibers have a weight per unit area (g/m²) of 50 to 300.

[5] The fiber-reinforced thermoplastic resin prepreg described in any one of [1] to [4], in which [C] the polyamide resin is at least one resin selected from a group consisting of aliphatic polyamide and aromatic polyamide.

[6] The fiber-reinforced thermoplastic resin prepreg described in any one of [1] to [4], in which [C] the polyamide resin is at least one resin selected from a group consisting of polyamide 6 and MXD6.

[7] The fiber-reinforced thermoplastic resin prepreg described in any one of [1] to [6], in which [B] the sizing agent contains at least one compound selected from a group consisting of a compound (A1) which is represented by the following formula (1) and a compound (B1) which is represented by the following formula (2).

[Chem. 1]

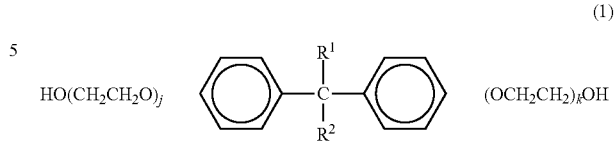

Formula (1)
[in the formula, $R^1$ and $R^2$ are each independently a hydrogen atom or an alkyl group, $R^1$ and $R^2$ may be the same or different from each other, and j and k are each independently an integer of 1 or higher, provided that the sum of j and k is an integer of 14 to 40].

[Chem. 2]

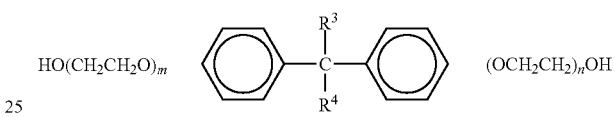

Formula (2)
[in the formula, $R^3$ and $R^4$ are each independently a hydrogen atom or an alkyl group, $R^3$ and $R^4$ may be the same or different from each other, and m and n are each independently an integer of 1 or higher, provided that the sum of m and n is an integer of 54 to 100].

[8] The fiber-reinforced thermoplastic resin prepreg described in [7], in which [13] the sizing agent is composed of a mixture of the compound (A1) which is represented by the above-described formula (1) and the compound (B1) which is represented by the above-described formula (2) and the mass ratio (A1)/(B1) is within a range of from 2/1 to ½.

[9] The fiber-reinforced thermoplastic resin prepreg described in any one of [1] to [7], in which [B] the sizing agent is a sizing agent containing:

a compound (A) which is an ester between an epoxy compound having one or more and three or less epoxy groups in the molecule and unsaturated monobasic acid and has at least one epoxy group in the molecule;

a urethane acrylate oligomer (B) of a bifunctional type; and an ester compound (C) which is an ester between alkylene oxide adduct of bisphenols and a dicarboxylic acid compound and has the acid number of 50 or higher, the mass ratio of the content of the compound (A) to the urethane acrylate oligomer (B) being within a range of the urethane acrylate oligomer (B)/the compound (A)=1/3 to 2/1, and the content of the ester compound (C) being not more than 2.0 fold by mass than the total amount of the compound (A) and the urethane acrylate oligomer (B).

[10] The fiber-reinforced thermoplastic resin prepreg described in any one of [1] to [9], in which the fiber-reinforced thermoplastic resin prepreg has a cut which has depth to cut, in a direction intersecting [A] the reinforcing fibers that are oriented in one direction, [A] the reinforcing fibers.

[11] The fiber-reinforced thermoplastic resin prepreg described in any one of [1] to [10], in which [A] the reinforcing fibers are carbon fibers and the fiber-reinforced thermoplastic resin prepreg is a carbon fiber-reinforced thermoplastic resin prepreg.

[12] A resin molded body obtained by laminating plural pieces of fiber-reinforced thermoplastic resin prepreg described in any one of [1] to [11].

[13] A resin molded body obtained by laminating plural pieces of fiber-reinforced thermoplastic resin prepreg containing [A] reinforcing fibers, [B] a sizing agent, and [C] polyamide resin, in which [B] the sizing agent and [C] the polyamide resin satisfy the following conditions and the void area ratio is 0.1% or more and 10% or less in any cross-section $$N_m/N_0<4.0$$

$N_0$ is an average of torques of a roller type blade required for maintaining the number of revolutions of a roller type blade at 100 rpm for 15 minutes, the average representing the fluidity of [C] the polyamide resin in cases where a mixer having a volume of 60 cc and a roller type blade is used, only [C] the polyamide resin is filled into the mixer such that the filling ratio is 60% relative to the volume of the mixer, and the resin is heated and melted at a temperature that is higher than the melting point of [C] the polyamide resin by 30° C., and $N_m$ is an average of torques of a roller type blade required for maintaining the number of revolutions of a roller type blade at 100 rpm for 15 minutes, the average representing the fluidity of a mixture which is obtained by using a mixer having a volume of 60 cc and a roller type blade, filling the mixer with a mixture, in which [B] the sizing agent and [C] the polyamide resin are mixed at 3:100 (mass ratio), such that the filling ratio is 60% relative to the volume of the mixer, and heating and melting the mixture at a temperature that is higher than the melting point of [C] the polyamide resin by 30° C.

[14] A method for producing a fiber-reinforced thermoplastic resin prepreg, the method is a method for producing a fiber-reinforced thermoplastic resin prepreg by adding [C] the melted polyamide resin to plural [A] the reinforcing fibers adhering to [B] the sizing agent and pressurizing them at a temperature that is higher than the melting point of [C] the polyamide resin by 10 to 60° C. and at a pressure of 0.1 to 5.0 MPa, in which [B] the sizing agent and [C] the polyamide resin satisfy the following conditions.

$$N_m/N_0<4.0$$

$N_0$ is an average of torques of a roller type blade required for maintaining the number of revolutions of a roller type blade at 100 rpm for 15 minutes, the average representing the fluidity of [C] the polyamide resin in cases where a mixer having a volume of 60 cc and a roller type blade is used, only [C] the polyamide resin is filled into the mixer such that the filling ratio is 60% relative to the volume of the mixer, and the resin is heated and melted at a temperature that is higher than the melting point of [C] the polyamide resin by 30° C., and $N_m$ is an average of torques of a roller type blade required for maintaining the number of revolutions of a roller type blade at 100 rpm for 15 minutes, the average representing the fluidity of a mixture which is obtained by using a mixer having a volume of 60 cc and a roller type blade, filling the mixer with a mixture, in which [B] the sizing agent and [C] the polyamide resin are mixed at 3:100 (mass ratio), such that the filling ratio is 60% relative to the volume of the mixer, and heating and melting the mixture at a temperature that is higher than the melting point of [C] the polyamide resin by 30° C.

[15] A method for producing a molded body including the following steps (1) to (4):

step (1): at least two pieces of the fiber-reinforced thermoplastic resin prepreg described in any one of [1] to [11] are laminated to obtain a prepreg laminate;

step (2): the prepreg laminate obtained from the step (1) is preheated at a temperature that is higher than the melting point of [C] the polyamide resin by 10 to 60° C.;

step (3): the preheated prepreg laminate is heated and pressurized at a temperature that is higher than the melting point of [C] the polyamide resin by 10 to 60° C. and at a pressure of 0.1 to 5.0 MPa; and step (4): the heated and pressurized prepreg molded body is cooled and pressurized at 0.1 to 5.0 MPa to obtain a molded body.

The followings are also one embodiment of the present invention.

[16] The fiber-reinforced thermoplastic resin prepreg described in any one of [1] to [11], in which $N_m/N_0$ is as follows:

$$0.8<N_m/N_0<3.0$$

[17] The resin molded body described in [12] or [13], in which $N_m/N_0$ is as follows:

$$0.8<N_m/N_0<3.0$$

[18] The resin molded body described in [13], in which the void area ratio is 10% or less in a cross-section.

Effect of the Invention

When a combination of reinforcing fibers, a sizing agent, and a polyamide resin which satisfy the conditions of the present invention is used, a polyamide resin can be favorably impregnated into a bundle of the reinforcing fibers, and thus a prepreg and a molded body with excellent dynamic properties can be obtained.

MODE(S) FOR CARRYING OUT THE INVENTION (Reinforcing Fibers)

As the reinforcing fibers that are used for the fiber-reinforced thermoplastic resin prepreg of the present invention, a glass fiber, a carbon fiber, a metal fiber, an organic fiber, or the like can be used although it is not particularly limited thereto. From the viewpoint of improving specific strength and rigidity, a glass fiber and a carbon fiber are preferable. A carbon fiber is particularly preferable.

(Carbon Fiber)

Regarding the carbon fiber as reinforcing fibers which can be used for the fiber-reinforced thermoplastic resin prepreg of the present invention, a carbon fiber bundle well known in the field of carbon fiber can be used, and it is not particularly limited thereto. A common carbon fiber bundle is in the form in which 1000 to 60000 single fibers with the single fiber fineness of 0.4 to 2.4 dtex are present as a bundle. The single fiber constituting this carbon fiber bundle is obtained by, for example, yarning an acrylonitrile polymer (hereinbelow, it may be also referred to as a PAN-based polymer), pitch, rayon, lignin or the like that are obtained from petroleum or coal followed by carbonization. In particular, a PAN-based carbon fiber having a PAN-based polymer as a raw material is preferred in that it has excellent productivity and mechanical characteristics at industrial scale. Meanwhile, it is sufficient for the PAN-based polymer to have an acrylonitrile unit in the molecular structure.

Examples thereof include a homopolymer of acrylonitirile and a copolymer between acrylonitrile and other monomer (for example, methacrylic acid). The content ratio of an acrylonitrile unit to other monomer in the copolymer between acrylonitrile and other monomer can be suitably determined depending on the properties of carbon fiber bundle to be produced.

Furthermore, regarding a surface state of carbon fiber, it is preferable that ipa value obtained by an electrochemical measurement (cyclic voltametry) be 0.05 to 0.45 µA/cm$^2$. The ipa value is affected by the number of oxygen-containing functional groups in carbon fiber, surface irregularity involved with forming of electric bilayer, and microstructure. In particular, in the case of carbon fiber having a significant etching on a surface layer or carbon fiber having an interlayer compound in which anionic ions are inserted to an interlayer of graphite crystals, the ipa exhibits a large value.

In the case of a composite material exhibiting excellent mechanical performance, an interface between carbon fiber and polyamide resin is important. In particular, carbon fiber with a presence of suitable oxygen-containing functional groups and a surface capable of forming a small electric bilayer can form an optimum interface, and therefore desirable.

When the ipa value is lower than 0.05 µA/cm$^2$, basically, carbon fiber having small number of the oxygen-containing functional group and not sufficient interface adhesiveness is yielded. Meanwhile, when the ipa value is higher than 0.45 µA/cm$^2$, excess etching of carbon fiber surface occurs or an interlayer compound is formed. Such a carbon fiber surface may be easily transformed into a weak surface layer, and as a result, carbon fiber having sufficient interface adhesiveness to polyamide resin is not obtained.

The ipa value is more preferably 0.07 to 0.36 µA/cm$^2$.

In the present invention, it is also important to have suitable interface adhesiveness to polyamide resin, and thus it is preferable to have carbon fiber in which the amount of oxygen-containing functional groups on carbon fiber surface (O1S/C1S), which is obtained by X ray photoelectron spectroscopy, is within a range of 0.05 to 0.16.

(Sizing Agent)

Examples of the sizing agent which may be used for the fiber-reinforced thermoplastic resin prepreg of the present invention include a sizing agent which satisfies the conditions that are represented by the following formula.

$$N_m/N_0 < 4.0$$

In the formula, $N_0$ is the average of torques of a blade required for maintaining the number of revolutions of a blade for stirring [C] the polyamide resin at 100 rpm for 15 minutes, the average representing the fluidity of [C] the polyamide resin which has been heated and melt, and $N_m$ is the average of torques of a blade required for maintaining the number of revolutions of a blade for stirring [C] the polyamide resin at 100 rpm for 15 minutes, the average representing the fluidity of a heated and melted mixture in which [B] the sizing agent and [C] the polyamide resin are mixed at the mass ratio of 3:100.

Specifically, $N_0$ is preferably the average of torques of a roller type blade required for maintaining the number of revolutions of a roller type blade at 100 rpm for 15 minutes, the average representing the fluidity of [C] the polyamide resin in cases where a mixer having a volume of 60 cc and a roller type blade (for example, LABO PLASTOMILL: type 50C150, type R60 roller mixer, blade shape: roller type, manufactured by TOYO SEIKI SEISAKU-SHO, LTD.) is used, only [C] the polyamide resin is filled into the mixer such that the filling ratio is 60% relative to the volume of the mixer, and the resin is heated and melted at a temperature that is higher than the melting point of [C] the polyamide resin by 30° C.

Specifically, $N_m$ is preferably the average of torques of a roller type blade required for maintaining the number of revolutions of a roller type blade at 100 rpm for 15 minutes, the average representing the fluidity of a mixture which is obtained by using a mixer having a volume of 60 cc and a roller type blade (for example, LABO PLASTOMILL: type 50C150, type R60 roller mixer, blade shape: roller type, manufactured by TOYO SEIKI SEISAKU-SHO, LTD.), filling the mixer with a mixture, in which [B] the sizing agent and [C] the polyamide resin are mixed at 3:100 (mass ratio), such that the filling ratio is 60% relative to the volume of the mixer, and heating and melting the mixture at a temperature that is higher than the melting point of [C] the polyamide resin by 30° C.

When $N_m/N_0$ value is excessively low, the affinity between [B] the sizing agent and [C] the polyamide resin is impaired, and thus there may be a case in which the fiber-reinforced thermoplastic resin to be obtained has deteriorated physical properties. On the other hand, when $N_m/N_0$ value is excessively high, the viscosity increases due to a reaction between [C] the polyamide resin and [B] the sizing agent and the impregnation property of [C] the polyamide resin into [A] the reinforcing fibers is impaired, and thus there may be a case in which physical properties are deteriorated.

The lower limit value of $N_m/N_0$ is preferably 0.5 or higher, and more preferably 0.8 or higher. The upper limit value thereof is preferably 3 or lower, and more preferably 2 or lower.

Namely, $N_m/N_0$ value is preferably 0.5 or higher and 3 or lower, and more preferably 0.8 or higher and 2 or lower.

For fluidity evaluation, kneading using a mixer can be generally used. For example, kneading by using LABO PLASTOMILL is preferable. By adding [C] the polyamide resin and the de-moisturized component of [B] the sizing agent to LABO PLASTOMILL followed by kneading and measurement of torque value, it is possible to evaluate the viscosity of a kneaded product.

Meanwhile, the ratio (mass ratio) of [B] the sizing agent to [C] the polyamide resin that are added is not limited to 3:100, and as long as the effect of the present invention is exhibited, it may be 1:100 to 5:100 or so.

When the mass of [B] the sizing agent relative to the mass of [C] the polyamide resin for addition is 5% by mass or more, [B] the sizing agent becomes excessive so that measurement with high precision cannot be achieved.

According to kneading, [C] the polyamide resin and a component of [B] the sizing agent react with each other, yielding a change in torque value. The time for kneading is not particularly limited. However, it is necessary to perform until the time at which torque value is constant during the kneading. For such reasons, it is sufficient that the time for kneading is from 5 minutes to 20 minutes. Time of 15 minutes or so is preferable.

At that time, [B] the sizing agent not causing an increase in torque value does not have a cross-reaction with [C] the polyamide resin, and thus not yielding viscosity increase. As such, the impregnation property of a melt resin into continuous fibers is improved during preparation of a prepreg.

With regard to kneading evaluation which uses LABO PLASTOMILL, mixer volume or blade (screw shape) also has an influence on torque value.

Meanwhile, the mixer volume is not limited to 60 cc. In the case of a thermoplastic resin which is used in the present invention ([C] the polyamide resin), preferred mixer volume can be 30 to 100 cc. Most preferably, the volume is 60 cc.

Furthermore, the blade shape is not limited to a roller type. As long as the effect of the present invention is exhibited, it may be a delta type, a cam type, a sigma type, a banburry type, or the like. Meanwhile, a roller type is preferably employed as a blade shape.

The amount of [C] the polyamide resin added to a mixer is not limited to 60% by volume of a mixer volume. As long as the effect of the present invention is exhibited, it may be 50% by volume or more and 95% by volume or less relative to a mixer volume.

When it is less than 50% by volume, torque evaluation with high precision cannot be achieved.

In the present invention, as long as the ratio of the average of torques of [C] the polyamide resin only ($N_0$) to the average of torques of a mixture of [C] the polyamide resin and [B] the sizing agent [C] ($N_m$), that is, $N_m/N_0$, is less than 4.0, type of [B] the sizing agent is not particularly limited. However, it is preferably a compound having in the molecule a hydroxyl group, a carboxy group, a urethane group, an amide group, an oxazoline group, polyester, a maleic anhydride group, an aziridine group, or the like, or a compound having one epoxy group, one amine or the like in the molecule.

Among them, a compound having a hydroxyl group or a carboxy group in the molecule is particularly preferable.

The compound having a carboxy group in the molecule is not particularly limited if a carboxy group is present at an end of molecular chain which is either linear or branched in branch form. Examples thereof include fumaric acid ester, maleic acid ester, saturated fatty acid, and unsaturated fatty acid.

Examples of the saturated fatty acid include propionic acid, undecylic acid, lauric acid, and tridecylic acid.

Examples of the unsaturated fatty acid include linolenic acid, linoleic acid, and oleic acid.

Examples of the compound having a hydroxyl group in the molecule include polyester polyol; polycarbonate polyol; polysaccharides; ethylene glycol and propylene glycol; and a polyhydroxyl compound like ethylene glycol (E.O. based) or propylene glycol (P.O. based) ether having, as a base, each group like an aliphatic group such as methyl, n-propyl, i-propyl, n-butyl, i-butyl, hexyl, or 2-ethylhexyl; an allyl group with a double bond; a phenyl group; and a benzyl group.

Among them, ether or propylene glycol (P.O. based) ether is particularly preferred.

Due to the polarity of a hydroxyl group which is present in a polyhydroxy compound, it is possible to have a strong interaction and a hydrogen bond between [B] the sizing agent and a surface of [A] the reinforcing fibers or [C] the polyamide resin. Since the hydrogen bond is not a chemical reaction but an intermolecular interaction, it does not prevent impregnation of the polyamide resin [C] into [A] the reinforcing fibers in an environment with the high temperature of 180° C. or higher. Further, the interaction is exhibited at a temperature of 150° C. or lower after completion of the impregnation to provide adhesiveness between [A] the reinforcing fibers and [C] the polyamide resin.

[B] The sizing agent is adhered to a surface of [A] the reinforcing fibers that can be used for a prepreg of the present invention. As for the polyhydroxy compound constituting [B] the sizing agent, at least one compound selected from a group consisting of the compound (A1) which is represented by the following formula (1) and the compound (B1) which is represented by the following formula (2) is preferably used. Both the compound (A1) and the compound (B1) are a compound having ethylene oxide added to two ends of a main part consisting of a bisphenol type skeleton (ethylene oxide is added to each of two benzene rings of a bisphenol type skeleton), and the difference between the compound (A1) and the compound (B1) is an amount of ethylene oxide added to each of two benzene rings of a bisphenol type skeleton.

[Chem. 3]

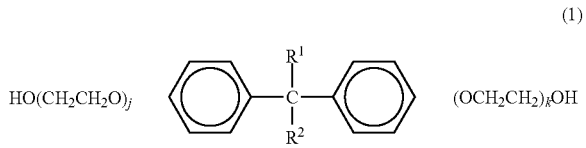

(1)

Formula (1)
[in the formula, $R^1$ and $R^2$ are each independently a hydrogen atom or an alkyl group with 1 to 2 carbon atoms, $R^1$ and $R^2$ may be the same or different from each other, and j and k are each independently an integer of 1 or higher, provided that the sum of j and k is 14 to 40].

[Chem. 4]

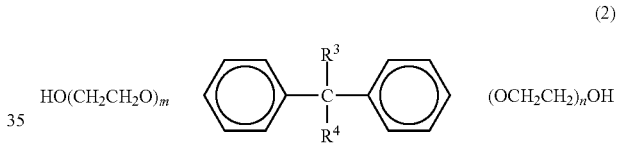

(2)

Formula (2)
[in the formula, $R^3$ and $R^4$ are each independently a hydrogen atom or an alkyl group, $R^3$ and $R^4$ may be the same or different from each other; and m and n are each independently an integer of 1 or higher, provided that the sum of m and n is an integer of 54 to 100].

In the compound (A1) which is represented by the above formula (1) and the compound (B1) which is represented by the above formula (2), each of $R^1$, $R^2$, $R^3$, and $R^4$ is preferably a hydrogen atom or an alkyl group having 1 to 2 carbon atoms. Furthermore, each of the compound (A1) and the compound (B1) can be present as a mixture.

With regard to the compound (A1) which is represented by the above formula (1) and the compound (B1) which is represented by the above formula (2), in particular a compound having a main part which consists of bisphenol A type or bisphenol F type skeleton has a relatively rigid structure. As such, it can provide good dynamic properties to [A] the reinforcing fibers. Furthermore, since the compound having a main part which consists of bisphenol A type or bisphenol F type skeleton has a π conjugation system so that it has good affinity for carbon fiber which consists of fine graphite crystals. Accordingly, the compound (A1) and the compound (B1) are preferably a compound which has a main part consisting of bisphenol A type or bisphenol F type skeleton, in particular.

With regard to the compound (A1) or the compound (B1), the amount of ethylene oxide added to two ends of a main part consisting of a bisphenol type skeleton (addition amount of ethylene oxide added to each of two benzene rings of a bisphenol skeleton) is not required to be the same for each of the two benzene rings of a bisphenol skeleton. However, since the compound (A1) or the compound (B1) is generally a compound which is obtained by adding ethylene oxide to a bisphenol compound, the addition amount of ethylene oxide added to each of two benzene rings of a bisphenol skeleton is mostly not much different between each of the two benzene rings of a bisphenol skeleton.

Meanwhile, the binding position of ethylene oxide which binds to each of the two benzene rings of a bisphenol skeleton can be any one of position 2, 3, 4, 5, and 6, and position 4 is preferable. Furthermore, the position of ethylene oxide which binds to the two benzene rings of a bisphenol skeleton can be the same or different from each other. It is preferably the same position.

With regard to the compound (A1) which is represented by the above formula (1), it is necessary that j and k are each independently an integer of 1 or higher and the sum of j and k is 14 to 40. Herein, a compound in which the sum of j and k is 41 to 53 has a melting point near room temperature (23° C.) to 30° C. and it converts from liquid to solid depending on atmospheric temperature during handling of [A] the reinforcing fibers. For such reasons, unstable exhibition of properties of [B] the sizing agent is yielded. Furthermore, a compound in which the sum of j and k is 13 or less exhibits a stable liquid phase at room temperature, but due to excessively low viscosity, the properties required for [B] the sizing agent cannot be exhibited, and also the viscosity is significantly increased due to adsorption of moisture in air. As such, properties as [B] the sizing agent are unstable, and due to insufficient water solubility, an aqueous solution obtained by dissolving it in water shows poor stability.

Based on the above reasons, as the compound (A1) represented by the above formula (1), a compound in which j+k is 20 to 35 is more preferable.

It is necessary that m and n of the compound (B1) which is represented by the above formula (2) are each independently an integer of 1 or higher and the sum of m and n is 54 to 100. Herein, a compound in which the sum of m and n is 41 to 53 has a melting point near room temperature (23° C.) to 30° C. and it converts from liquid to solid depending on atmospheric temperature during handling of [A] the reinforcing fibers as described above. For such reasons, unstable exhibition of properties of [B] the sizing agent is yielded. Furthermore, a compound in which the sum of m and n is more than 100 exhibits an increased fixing property due to an increase in molecular weight. For such reasons, the bundling property of a bundle of [A] the reinforcing fibers becomes stronger so that the flexibility of a bundle of [A] the reinforcing fibers and an opening property of [A] the reinforcing fibers during the step of impregnating [C] the polyamide resin are significantly inhibited.

Based on the reasons described above, the more preferred compound (B1) which is represented by the above formula (2) is a compound in which the sum of m and n is 60 to 90.

As shown above, in many cases the compound (A1) which is represented by the above formula (1) exhibits a viscous liquid phase at room temperature (23° C.). Furthermore, although there is a case in which the compound (B1) which is represented by the above formula (2) exhibits a slightly viscous property at room temperature (23° C.), in most cases it exhibits a solid phase.

Specifically, as for [B] the sizing agent used for the fiber-reinforced thermoplastic resin prepreg of the present invention, the compound (A1) or the compound (B1) may be used singly, or it may be used as a mixture of the compound (A1) which exhibits a liquid phase at room temperature and the compound (B1) which exhibits a solid phase at room temperature. The mass ratio (A1):(B1) can be within any range as long as it falls within a range of 0:100 to 100:0. More preferred range is 100:50 to 50:100 (specifically, in terms of more preferred mass ratio of the compound (A1) to the compound (B1), ((A1)/(B1)), it is 2/1 to 1/2). By treating [A] the reinforcing fibers in this range, it is possible to have good resin impregnation property as well as stable scratch performance and opening property.

Furthermore, [B] the sizing agent can be a sizing agent containing: the compound (A2) which is an ester between an epoxy compound having one or more and three or less epoxy groups in the molecule and unsaturated monobasic acid and has at least one epoxy group in the molecule; the urethane acrylate oligomer (B2) of a bifunctional type; and the ester compound (C2) which is an ester between alkylene oxide adduct of bisphenols and a dicarboxylic acid compound and has the acid number of 50 or higher, in which the mass ratio of the content of the compound (A2) to the urethane acrylate oligomer (B2) (the urethane acrylate oligomer (B2)/the compound (A2)) is within a range of from 1/3 to 2/1 and content of the ester compound (C2) is not more than 2.0 fold by mass than the total amount of the compound (A2) and the urethane acrylate oligomer (B2).

As for the "unsaturated monobasic acid" constituting an epoxy compound and ester for the component (A2) is not particularly limited, and it is sufficiently a compound having one unsaturated group and one carboxy group.

The unsaturated group is not particularly limited, but from the viewpoint of not having large volume and not lowering the rigidity of an ester main chain composed of an epoxy compound and unsaturated monobasic acid, it is preferably vinyl group or a propenyl group. A vinyl group is more preferable.

Particularly preferred example of the unsaturated monobasic acid is acrylic acid or methacrylic acid. Namely, the component (A2) is preferably an ester between the aforementioned epoxy compound and acrylic acid or methacrylic acid.

The component (B2) has an effect of forming an interface phase with excellent flexibility at an interface between [C] the polyamide resin and [A] the reinforcing fibers. As an interface phase with excellent flexibility is formed at an interface between [C] the polyamide resin and [A] the reinforcing fibers, the interface adhesiveness between [C] the polyamide resin and [A] the reinforcing fibers is enhanced.

Furthermore, during forming of a composite between [A] the reinforcing fibers adhering to [B] the sizing agent and [C] the polyamide resin, the component of [B] the sizing agent on [A] the reinforcing fibers diffuses into [C] the polyamide resin, and as a result, a region in which the component of [B] the sizing agent is contained at high concentration is formed in [C] the polyamide resin, particularly near the interface. Mechanical properties of a composite material are affected by this region.

Since the component (B2) is a urethane acrylate oligomer, affinity for [C] the polyamide resin is improved when a fiber-reinforced composite material is formed, and thus integration between the interface phase and [C] the polyamide resin phase is achieved. For such reasons, even when [C] the polyamide resin is prepared as a matrix resin, by containing this component (B2), mechanical properties of a fiber-reinforced composite material can be enhanced.

As described herein, the term "urethane acrylate oligomer" means a compound which has a urethane bond and an acryloyl group (CH2=CH—CO—) in the molecule. The urethane acrylate oligomer can be classified into an aromatic compound which has an aromatic group in the structure and an aliphatic compound which does not have an aromatic group in the structure.

As the urethane acrylate oligomer component, commercially available urethane acrylate oligomer can be used, and examples of those urethane acrylate oligomer include CN-965, CN-981, CN-9178, CN-9788, CN-9893, CN-971, CN-973, and CN-9782 manufactured by Sartomer Company, Inc.; UF-8001 manufactured by KYOEISHA CHEMICAL Co., LTD.; and UA-122P manufactured by Shin-Nakamura Chemical Co., Ltd.

In the present invention, the component (B) may be used either singly or in combination of two or more types.

The structure of the urethane acrylate oligomer which is used in the present invention is not particularly limited, and it may be either an aromatic compound or an aliphatic compound. From the viewpoint of having good balance between the tensile elongation and tensile strength of a cured product, an aliphatic compound is preferable.

In addition to the aforementioned component (A2) and component (B2), [B] the sizing agent additionally contains the ester compound (C2), which is an ester between alkylene oxide adduct of bisphenols and a dicarboxylic acid compound, having the acid number of 50 or higher (hereinbelow, referred to as the component (C2)).

When the ester between alkylene oxide adduct of bisphenols and a dicarboxylic acid compound has the acid number of 50 or higher and 100 or lower, a compound having molecular weight of 1000 or so (for example, 500 to 3000) and having a carboxy group at one end of the molecule is contained as a main constitutional component. This component (C2) exhibits excellent compatibility with [C] the polyamide resin. As such, the wetting property of [A] the reinforcing fibers obtained after a sizing treatment for a resin is enhanced, yielding more improved resin impregnation property.

As for the "alkylene oxide adduct of bisphenols" for forming the component (C2), a compound in which 2 to 4 moles of ethylene oxide or propylene oxide are added to bisphenols is preferable. A compound in which at least 5 moles or more of ethylene oxide or propylene oxide are added to bisphenols loses the rigidity of a molecular chain that is intrinsic to bisphenols, and thus the affinity for [C] the polyamide resin may be impaired.

More preferably, it is a compound in which 2 moles of ethylene oxide or propylene oxide are added to bisphenols. As for the alkylene oxide adduct of bisphenols, a single type of the compound can be used or plural compounds may be used as a mixture.

The "dicarboxylic acid compound" for forming an ester with alkylene oxide adduct of bisphenols is preferably an aliphatic compound having 4 to 6 carbon atoms. When an aromatic compound is used as a dicarboxylic acid compound, the ester compound to be obtained has high melting temperature, and thus the solubility with [C] the polyamide resin may be impaired. Furthermore, a good wetting property may not be exhibited due to it.

Meanwhile, when an aliphatic compound having 7 or more carbon atoms is used as a dicarboxylic acid compound, the ester compound to be obtained loses the rigidity, and thus the affinity for [C] the polyamide resin may be impaired.

Examples of the dicarboxylic acid include fumaric acid, maleic acid, methylfumaric acid, methylmaleic acid, ethylfumaric acid, ethylmaleic acid, glutaconic acid, itaconic acid, malonic acid, succinic acid, methylsuccinic acid, glutaric acid, and adipic acid.

Meanwhile, as a sizing agent, when a sizing agent having high reactivity with a polyamide resin for promoting a cross-linking reaction with a polyamide resin is used, torques required for maintaining the number of revolutions of a blade during kneading by a mixer increase. In other words, the viscosity increases. When such sizing agent is used, a reaction occurring at the interface of a sizing agent is promoted when a melt resin is impregnated in continuous fibers that are arranged in one direction, and thus a poor impregnation property is yielded.

The adhesion amount of [B] the sizing agent on [A] the reinforcing fibers is, although not particularly limited, preferably 0.01 to 5.00% by mass, more preferably 0.05 to 3.00% by mass, and even more preferably 0.10 to 2.00% by mass relative to the mass of [A] the reinforcing fibers only. When the adhesion amount of [B] the sizing agent on [A] the reinforcing fibers is less than 0.01% by mass, it is difficult to have the effect of improving adhesiveness. On the other hand, when the adhesion amount is more than 5.00% by mass, [B] the sizing agent remained unreacted may exhibit an adverse effect on mechanical properties of the resin composition (fiber-reinforced thermoplastic resin prepreg).

Meanwhile, the term "adhesion" described herein means a contact of a sizing agent to carbon fiber bundle.

The method for adhering a sizing agent is, although not particularly limited, preferably a method in which a sizing agent is prepared as an aqueous dispersion or a solution (hereinbelow, it may be also referred to as a sizing solution) and it is brought into contact with a carbon fiber bundle. Specifically, the adhesion can be achieved according to a touch roll method or an impregnation method that are described below.

Furthermore, the adhesion amount can be measured by using a TGA analyzer or the like by a weight change of a carbon fiber bundle adhering to a sizing agent.

[[C] Polyamide Resin]

Examples of [C] the polyamide resin in the present invention include aliphatic polyamide and aromatic polyamide.

Examples of the aliphatic polyamide include polycaprolactam (Nylon 6), polyhexamethylene adipamide (Nylon 66), polytetramethylene adipamide (Nylon 46), polyundecane amide (Nylon 11), polydodecane amide (Nylon 12), polyhexamethylene sebacamide (Nylon 610), Nylon 612, polyhexamethylene azelamide (Nylon 69) and copolymers thereof like Nylon 6/66 copolymer, polycaproamide/polyhexamethylene sebacamide copolymer (Nylon 6/610 copolymer), Nylon 6/66/610 copolymer, Nylon 6/12 copolymer, and Nylon 6/66/610/12 copolymer.

Furthermore, examples of the aromatic polyamide (aromatic Nylon) include polyhexamethylene terephthalamide (Nylon 6T), Nylon 9T, Nylon MXD6, Nylon MXD10, Nylon 6/6T copolymer, Nylon 6T/12 copolymer, Nylon 6T/66 copolymer, polycaproamide/polyhexamethylene isophthalamide copolymer (Nylon 6/6I copolymer), Nylon 66/6I/6 copolymer, Nylon 6T/6I copolymer, Nylon 6T/6I/66 copolymer, and Nylon 6T/M-5T copolymer.

From the viewpoint of the impregnation property or molding property, Nylon 6, Nylon 12, Nylon 610, Nylon 612, or Nylon MXD6 having melting point of 250° C. or lower is preferable. From the viewpoint of the molding property or versatility, Nylon 6, and MXD6 as a material having high dynamic properties and low water absorption property, are particularly preferable. It is also possible to use two or more types of the polyamide resin after kneading.

Melt viscosity of [C] the polyamide resin used in the present invention can be evaluated by complex viscosity based on dynamic viscoelasticity measurement. It is preferable that [C] the polyamide resin used in the present invention preferably have complex viscosity of 30 to 250 Pa·s. In the present invention, the evaluation can be made by using a rotary type viscometer and a parallel plate, in particular.

The measurement temperature is preferably a temperature that is higher than the melting point of [C] the polyamide resin by 20 to 50° C. It is preferably a temperature that is higher than the melting point of [C] the polyamide resin by 30° C. When the temperature is lower than the melting point of [C] the polyamide resin by 20° C. or more, there is a possibility that sufficient melting is not obtained. On the other hand, when the temperature is higher than the melting point of [C] the polyamide resin by 50° C. or more, there is a possibility that the resin is decomposed.

Furthermore, the angular frequency for measurement is 100 rad/s to 0.1 rad/s, and the value at 0.1 rad/s is determined as melt viscosity.

The complex viscosity of [C] the polyamide resin which is used in the present invention can be expressed as melt viscosity, which is measured at a temperature that is higher than the melting point of [C] the polyamide resin by 30° C., the displacement of 20%, and the angular frequency of 0.1 rad/s by dynamic viscoelasticity measurement using a rotary viscometer, in which a parallel plate is used.

The melt viscosity measured at the aforementioned conditions (complex viscosity) is preferably 30 to 250 Pa·s. When the melt viscosity measured at the aforementioned conditions is significantly higher than 250 Pa·s, the viscosity of [C] the polyamide resin is high so that the impregnation property of [C] the polyamide resin into [A] the reinforcing fibers is deteriorated during prepreg preparation. On the other hand, when the melt viscosity measured at the aforementioned conditions is significantly lower than 30 Pa·s, problems like a decrease in discharge stability of [C] the polyamide resin during production process and difficulty in film production occurs. Furthermore, even when the viscosity is within the aforementioned range, if the fluidity is measured after mixing [C] the polyamide resin and [B] the sizing agent, the ratio ($N_m/N_0$) of the average of torques from a mixture of [C] the polyamide resin and [B] the sizing agent to the average of torques from [C] the polyamide resin only is 4.0 or more, it is believed that the reaction progresses during prepreg production at an interface at which [C] the polyamide resin and [B] the sizing agent are in contact with each other, yielding an increase in the viscosity of [C] the polyamide resin. Accordingly, the impregnation property of [C] the polyamide resin into [A] the reinforcing fibers is impaired during prepreg production.

For such reasons, in the present invention, it is preferable to select [B] the sizing agent allowing that, when the fluidity is measured by using [C] the polyamide resin which has melt viscosity of 30 to 250 Pa·s when measured at the aforementioned conditions and also by using a mixture of [C] the polyamide resin and [B] the sizing agent, the ratio ($N_m/N_0$) of the average of torques from a mixture of [C] the polyamide resin and [B] the sizing agent to the average of torques from the resin only is less than 4.0.

The melt viscosity of [C] the polyamide resin which is measured at the aforementioned conditions is preferably 50 to 200 Pa·s.

The amount of [A] the reinforcing fibers contained in the fiber-reinforced thermoplastic resin prepreg of the present invention is, from the viewpoint of the mechanical properties and economic value of the resin composition (fiber-reinforced thermoplastic resin prepreg), preferably 15 to 80% by mass relative to the total mass of the fiber-reinforced thermoplastic resin prepreg. As it has been described above, the adhesion amount of [B] the sizing agent to [A] the reinforcing fibers is most preferably 0.1 to 2% by mass, and thus the content of [B] the sizing agent is preferably 0.02 to 2% by mass relative to the total mass of the fiber-reinforced thermoplastic resin prepreg. Since the remaining is [C] the polyamide resin, which is a matrix resin, preferable content of [C] the polyamide resin is 18 to 85% by mass relative to the total mass of the fiber-reinforced thermoplastic resin prepreg. When the amount of [A] the reinforcing fibers is excessively small, high physical properties may not be obtained. On the other hand, when the amount of [B] the sizing agent is excessively small, it is difficult to have adhesiveness to [C] the polyamide resin and a poor bundling property is obtained. On the other hand, when the amount is excessively large, it is difficult to have a spread property during prepreg production. There is also a possibility that the mechanical properties of the resin composition are adversely affected by unreacted [B] the sizing agent. Furthermore, when the amount of [C] the polyamide resin is excessively small, the amount of [A] the reinforcing fibers increases, yielding a poor impregnation property of [C] the polyamide resin. On the other hand, when it is excessively large, the reinforcing effect of [A] the reinforcing fibers is not obtained, and thus high physical properties are not obtained. More preferably, the content of [A] the reinforcing fibers is 30 to 65% by mass relative to the total mass of the fiber-reinforced thermoplastic resin prepreg, the content of [B] the sizing agent is 0.1 to 1.5% by mass relative to the total mass of the fiber-reinforced thermoplastic resin prepreg, and the content of [C] the polyamide resin is 30 to 65% by mass relative to the total mass of the fiber-reinforced thermoplastic resin prepreg, As unidirectional continuous fiber, [A] the reinforcing fibers in the fiber-reinforced thermoplastic resin prepreg of the present invention preferably has a weight per unit area (g/m$^2$) in the range of 50 to 300 g/m$^2$, although it is not particularly limited thereto. When it is within this range, it becomes possible to produce a prepreg having more improved impregnation property. When the weight per unit area is excessively low, the fiber-opening property of fiber may be impaired. On the other hand, when the weight per unit area is excessively high, a poor impregnation property may be yielded. In the present invention, more preferred range of the weight per unit area is 70 to 200 g/m$^2$.

The fiber-reinforced thermoplastic resin prepreg of the present invention can be produced by adhering [B] the sizing agent to a bundle of [A] the reinforcing fibers followed by combination with [C] the polyamide resin.

The method for adhering [B] the sizing agent to a bundle of [A] the reinforcing fibers which can be preferably used is, although not particularly limited, a method in which [B] the sizing agent is prepared as an aqueous dispersion or a solution (hereinbelow, it may be also referred to as a sizing solution) and it is brought into contact with a bundle of [A] the reinforcing fibers. Specifically, there is a touch roll method in which a part of a roll is impregnated in the sizing solution for surface transfer and a bundle of [A] the reinforcing fibers is brought into contact with the roll to apply the sizing solution. There is also an impregnation method in which a bundle of [A] the reinforcing fibers is directly impregnated in the sizing solution.

The adhesion amount of [B] the sizing agent to a bundle of [A] the reinforcing fibers can be controlled by adjusting the concentration of [13] the sizing agent in the sizing solution or a drawing amount. From the viewpoint of easiness of process management or safety, the sizing solution is more preferably an aqueous dispersion. Meanwhile, the method for producing [B] the sizing agent is not limited. However, when it is used as an aqueous dispersion, mention can be made for a method in which [B] the sizing agent is added to water, heated to the temperature higher than the melting point of [B] the sizing agent, and stirred at high shearing conditions followed by cooling.

[Prepreg]

Hereinbelow, the method for producing the prepreg of the present invention is described. However, the present invention is not particularly limited to it.

In the present invention, the method for producing a prepreg is a method of producing a fiber-reinforced thermoplastic resin prepreg including adding [C] the polyamide resin, which has been melt, to a plurality of [A] the reinforcing fibers adhering to [B] the sizing agent and pressurizing them at a temperature that is higher than the melting point of [C] the polyamide resin by 10 to 60° C. and at a pressure of 0.1 to 5.0 MPa.

Meanwhile, as described in the detailed description and claims of the present invention, the expression "temperature that is higher than the melting point of [C] the polyamide resin by 10 to 60° C." indicates an internal temperature of the resin.

Examples of a method for adding [C] the polyamide resin which has been melt to a plurality of [A] the reinforcing fibers include the followings: a method in which a film of [C] the polyamide resin is formed followed by melting and impregnation; a method of coating and impregnating [A] the reinforcing fibers with [C] the polyamide resin after melting [C] the polyamide resin using an extruder; a method of melting and impregnation after dispersing resin powder of [C] the polyamide resin in [A] the reinforcing fibers; a method of impregnating [C] the polyamide resin melt dissolved in a solvent in [A] the reinforcing fibers followed by removing the solvent; and a method of preparing [C] the polyamide resin in fiber shape, mixing it with [A] the reinforcing fibers, and melting and impregnating them. However, from the viewpoint of stable production or the like, a method in which a film of [C] the polyamide resin is formed followed by melting and impregnation and a method of coating and impregnation after melting [C] the polyamide resin using an extruder are preferable.

With regard to the method in which a film of [C] the polyamide resin is formed followed by melting and impregnation, a film is first formed by using [C] the polyamide resin which is described above. The method for forming a film is not particularly limited, and examples of the method include a method of melting pellets of [C] the polyamide resin and extruding them from a T die. The thickness of the film of [C] the polyamide resin is not particularly limited. It is preferably 10 to 100 μm, and more preferably 25 to 50 μm.

With regard to the thermoplastic resin ([C] the polyamide resin) described above, there is a method of producing a prepreg in which two layer-parts of aforementioned [C] the polyamide resin in film shape are prepared and inserted from both sides of a sheet of [A] the reinforcing fibers, which have been spreaded according to a known method, by continuously and unidirectionally supplying a sheet of [A] the reinforcing fibers, followed by heating and application of pressure. More specifically, while supplying two-layer portions of a film from two rolls for supplying a pair of thermoplastic resin film ([C] the polyamide resin film), a sheet of reinforcing fibers supplied from a sheet roll of reinforcing fibers is inserted between the films to form a three-layer structure having thermoplastic resin film-reinforcing fibers sheet-thermoplastic resin film, so-called sandwich structure, followed by heating and application of pressure. As a means for heating and application of pressure, a known method can be used. It can be a method requiring a process of multi-steps which uses one or more heating rolls or a heating device or several pairs of a heating roll. Furthermore, a method of molding continuously after insertion between two belts like a double-belt press machine can be mentioned.

It can be also a method in which only one side of a film is used and impregnation is performed from one side.

Although the heating temperature may vary depending on type of the polyamide, in general, it is preferably 200 to 400° C. In the case of Nylon 6 or MXD6 Nylon, it is preferably 240° C. to 280° C. Meanwhile, the pressure during the application of pressure is preferably 0.1 to 5.0 MPa. By having the pressure of 0.1 to 5.0 MPa, effective impregnation can be achieved while suppressing fiber meandering or resin flow.

Furthermore, when the impregnation is poor, it is possible to promote the impregnation by repeating several times the application of pressure.

As another method for producing a prepreg, there is a method in which a sheet of reinforcing fibers obtained by supplying unidirectionally and continuously a bundle of reinforcing fibers is added with a melt resin extruded from an extruder and impregnated with it by pressurization using a roll or the like.

It is also possible that a sheet of spread reinforcing fibers is supplied to a die head of a melt-extruder and impregnated with a resin to produce a prepreg.

Preferred mode of the prepreg of the present invention is a continuous fiber-reinforced prepreg with unidirectional arrangement. However, the mode of the prepreg is not limited thereto, and a prepreg can be also produced by using a unidirectional curtain-like material in which fibers in one direction are terminated by weft, a continuous fiber fabric, or a non-crimp fabric. A sheet of continuous fiber-reinforced prepreg can be used in the form like the one having a slit in tape shape in which slit is made during molding or random-sheet form obtained by further cutting and scattering a sheet in tape shape.

The prepreg of the present invention may have a cut, and it is a cut which has depth to cut [A] the reinforcing fibers in a direction intersecting [A] the reinforcing fibers that are oriented in one direction.

The length L of [A] the reinforcing fibers which have been cut is, although not particularly limited, preferably 5 mm or more and 100 mm or less from the viewpoint of the dynamic properties and fluidity. To have both sufficient dynamic physical properties and fluidity of a rib or the like to a thin part during stamping molding, it is more preferably 10 mm or more and 50 mm or less.

In the present invention, a prepreg having a cut can be obtained by creating a cut using a laser marker, a cutting plotter, or a blanking mold. When it is a cut obtained by using a laser marker, there is an effect that a complex cut like curves and zigzag lines can be processed at high speed, and therefore preferable. Furthermore, when it is a cut obtained by using a cutting plotter, there is an effect that a prepreg layer of at least 2 m, which is larger than regular size, can be processed, and therefore preferable. Furthermore, when it is a cut obtained by using a blanking mold, there is an effect that the processing can be achieved at high speed, and therefore preferable.

The fiber-reinforced thermoplastic resin prepreg of the present invention, which can be used for a molded body, is prepared as a thermoplastic molded plate after undergoing each of the following steps:

step (1): at least two pieces of the fiber-reinforced thermoplastic resin prepreg, which is one embodiment of the present invention, are laminated to obtain a prepreg laminate;

step (2): the prepreg laminate obtained from the step (1) is preheated at a temperature that is higher than the melting point of [C] the polyamide resin by 10 to 60° C.:

step (3): the preheated prepreg laminate is heated and pressurized at a temperature that is higher than the melting point of [C] the polyamide resin by 10 to 60° C. and a pressure of 0 to 5.0 MPa; and step (4): the heated and pressurized prepreg molded body is cooled and pressurized at 0.1 to 5.0 MPa to obtain a molded body.

When the method for producing a molded body is a batchwise process, various temperatures may vary depending on the polyamide thermoplastic resin to be used. However, after increasing the temperature of a heating section of a molding machine to a range of 200° C. to 350° C., a laminate obtained by laminating at least two pieces of thermoplastic prepreg is introduced to a heating section of a molding machine and preheated until the temperature of the laminate is higher than the melting point by 10 to 60° C. Viscosity range most suitable for the impregnation is obtained by having it in the aforementioned range. When it is higher by 60° C. or more, [C] the polyamide resin may be decomposed, and therefore not desirable.

Meanwhile, the number of lamination pieces of the thermoplastic prepreg can be suitably adjusted depending on the thickness of the thermoplastic prepreg and the thickness of a molded plate as a final product. It may be 2 to 50 pieces, for example. It is preferably 4 to 20 pieces.

After that, as a step for heating and pressurizing, the thermoplastic prepreg is pressed for 1 minute to 10 minutes at a pressure of 0 to 5.0 MPa while maintaining the temperature of a heating section of a molding machine. When the pressure is 5.0 MPa or more, fiber meandering is easy to occur. It is also possible to have a method in which pressure is not applied after preheating. After that, as a step for cooling and pressurizing, the thermoplastic prepreg is transferred to a cooling section of a molding machine followed by pressurizing. Although the cooling temperature may vary depending on the melting point or crystallization behavior of [C] the polyamide resin to be used, it is preferable that the cooling be performed for 1 minute to 10 minutes until the surface temperature of a cooling section is 30° C. to 120° C. and the resin temperature is 30 to 150° C.

Meanwhile, in the case of a continuous process, there is a method in which a laminate obtained by laminating at least two pieces of thermoplastic prepreg is applied on a steel belt, preheated to 150° C. to 300° C., the temperature being variable depending on the thermoplastic resin to be used, heating and pressurizing it by passing it through rolls preheated in advance to 180° C. to 350° C., and cooling and pressurizing it to obtain a thermoplastic molded plate. The process can be suitably selected depending on materials, for example, the heating and pressurizing, and the cooling and pressurizing are performed by using a belt press or the preheating is performed according to a far infrared heating method, electromagnetic induction method, or Joule heating method.

The pressurizing time in the heating and pressurizing step is, although it may vary depending on materials, size or the like of a molding frame to be used, preferably 1 minute or longer and 10 minutes or shorter. When the pressurizing time is shorter than 1 minute, there is a significant difference between the temperature of a heating section of a molding machine and the temperature of a laminate of a thermoplastic prepreg after the heating and pressurizing step, and thus the heating tends to be insufficient. On the other hand, when the pressurizing time is longer than 10 minutes, sufficient heating can be obtained as there is no significant difference between the temperature of a heating section of a molding machine and the temperature of a laminate of a thermoplastic prepreg after the heating and pressurizing step. However, as the total molding time is extended, the productivity tends to be lowered.

The pressure applied during the cooling and pressurizing step of the method for producing a thermoplastic molded body of the present invention is 0.1 MPa or more and 5.0 MPa in terms of the pressure near the heating surface of a thermoplastic molded body to be obtained. When the pressure is excessively low, thermal shrinkage of a thermoplastic resin which occurs during cooling cannot be followed, and thus there is a tendency of having an occurrence of tiny new voids in the system. There is also a tendency that the thermoplastic molded plate obtained at such molding conditions has inferior mechanical properties. Meanwhile, if the pressure is excessively high, the amount of burrs occurring during the heating and pressurizing step increases, and thus the fiber volume content or the like in the obtained thermoplastic molded plate tends to be different compared to the injection. The time for cooling and pressurizing is preferably 1 minute to 10 minutes.

In the present invention, the molded body has preferably void area ratio of 10% or less. The void area ratio indicates the ratio of cross-sectional area of void section (voids) relative to any cross-sectional area of an obtained molded body, and the cross-section can be observed by SEM or optical microscopy. In the present invention, the void area ratio is preferably 10% or less and more preferably 8% or less.

EXAMPLES

Hereinbelow, the present invention is specifically described in view of Examples.

Furthermore, the carbon fiber bundle of the present invention is described more specifically based on Examples, but the present invention is not limited to them.

Preparation Example 1

Sizing Solution A

By using a mixer (manufactured by Tokushu Kika Kogyo Co., Ltd., trade name: HIVIS DISPER MIX, homo mixer mode: mode 3D-5 type), a sizing solution was prepared by reverse phase emulsion method in the following order.

A mixture containing 40 parts by mass of epoxy resin jER (registered trade mark) 828 (trade name, manufactured by Japan Epoxy Resins Co., Ltd.), 40 parts by mass or epoxy resin jER (registered trade mark) 1001 (trade name, manufactured by Japan Epoxy Resins Co., Ltd.), and 20 parts by mass of non-ionic surfactant Pluronic F88 (trade name, manufactured by BASF) was kneaded and mixed at 90° C. by using a planetary mixer and a homo mixer to obtain the resin composition (II) (sizing agent). Next, de-ionized water was added dropwise by a small amount to the resin composition (II), and after passing the reverse phase point, the amount for dropwise addition was increased. Finally, the sizing solution A with resin composition concentration of 40% by mass was obtained.

Preparation Example 2

Sizing Solution B

A mixture of 50 parts by mass of bisphenol A ethylene oxide 60 mole adduct (manufactured by Matsumoto Yushi-Seiyaku Co., Ltd.) and 50 parts by mass of bisphenol A ethylene oxide 30 mole adduct (manufactured by Matsumoto Yushi-Seiyaku Co., Ltd.) was added to de-ionized water and stirred therein. Finally, the sizing solution B with resin composition concentration of 70% by mass was obtained.

Preparation Example 3

Sizing Solution C

The component (A2), the component (B2), the component (C2), and other components of the following type and amount were kneaded and mixed at 80 to 100° C. by using a planetary mixer and a homo mixer. After that, the temperature was lowered to 80° C. while maintaining the kneading and an aqueous solution of the component (D) was added by a small amount thereto. The viscosity of the content gradually increased during this step. After adding the entire amount of an aqueous solution of the component (D), the temperature was lowered for 10 minutes to 60° C. under sufficient kneading. Next, de-ionized water was added dropwise by a small amount thereto, and after passing the reverse phase point, the amount for dropwise addition was increased. Finally, an aqueous dispersion of the sizing solution C with effective component content of 40% by mass or so was obtained.

(A2) Bisphenol A epoxy resin with one end modified by acryl (35 parts by mass) (EP828 base) manufactured by Mitsubishi Rayon Co., Ltd.

(B2) Aliphatic urethane acrylate oligomer (30 parts by mass)CN-9788, manufactured by Sartomer Company, Inc.

(C2) Anhydrous fumaric acid ester of bisphenol A—ethylene oxide 2 mole adduct (20 parts by mass) (Oxide 55) Mitsubishi Rayon Co., Ltd.

(D) Nippon Nyukazai Co., Ltd. Newcol 723SF (15 parts by mass).

[Polyamide Resin]
Nylon 6 (manufactured by Ube Industries, Ltd., 1013B)
Nylon 6 (manufactured by Ube Industries, Ltd 1022B)
MXD6 (manufactured by Mitsubishi Gas Chemical Company, Inc., 56001)

(Measurement of Melt Viscosity)

The polyamide resin was subjected to press molding to have the thickness of 1 mm, and by using a punching blade, a test specimen (diameter of 25 mmφ) for measuring viscoelasticity was prepared. The test specimen was loaded on a rotary type viscometer at 255° C. of Nylon 6 or at 270° C. for MXD6. Then, dynamic viscoelasticity was measured at the angular frequency of from ω=100 (rad/sec) to 0.1 (rad/sec) and the displacement of from 5 to 20%. As a measurement device, ARES100FRTN1 (manufactured by TA Instruments, Japan) was used. As a jig for measurement, a parallel plate with diameter of 25 mmφ was used. The melt viscosity at angular frequency ω=0.1 (rad/sec) in the obtained dynamic viscoelasticity data was used as complex viscosity. The displacement applied to the sample during the measurement was suitably adjusted such that the measured torques are within a dynamic range of a device transducer.

(Measurement of Fluidity)

The evaluation was made by using LABO PLASTOMILL (50C150) manufactured by TOYO SEIKI SEISAKU-SHO, LTD. with mixer volume of 60 cc, and a blade (R60).

The polyamide resin was weighed so as to have filling ratio of about 60% (Nylon 6:41 g, MXD6:44 g). Next, it was added to the mixer which has been heated in advance to a temperature which is higher than the melting point by 30° C. (Nylon 6; 255° C. and MXD6; 270° C.) and kneaded for 15 minutes by rotating the screw at 100 rpm. $N_0$ is obtained as the average of torques of a screw for 15 minutes required for maintaining the screw at 100 rpm during the kneading.

Furthermore, the polyamide resin was heated until there is no change in mass at 80° C., and the de-moisturized sizing solution A to C was admixed therein in an amount for having resin composition of 3 wt %.

Nylon 6: resin 40 g, and sizing composition 1.2 g
MXD6: resin 42 g, and sizing composition 1.3 g The average of torques ($N_m$) was measured for the obtained mixture in the same manner as above.

The torque ratio (N) was obtained according to the following formula.

$$N=N_m/N_0$$

$N_0$: an average of torques of a roller type blade required for maintaining the number of revolutions of a roller type blade at 100 rpm for 15 minutes, the average representing the fluidity of [C] the polyamide resin in cases where a mixer having a volume of 60 cc and a roller type blade is used, only [C] the polyamide resin is filled into the mixer such that the filling ratio is 60% relative to the volume of the mixer, and the resin is heated and melted at a temperature that is higher than the melting point of [C] the polyamide resin by 30° C.

$N_m$: an average of torques of a roller type blade required for maintaining the number of revolutions of a roller type blade at 100 rpm for 15 minutes, the average representing the fluidity of a mixture which is obtained by using a mixer having a volume of 60 cc and a roller type blade, filling the mixer with a mixture, in which [B] the sizing agent and [C] the polyamide resin are mixed at 3:100 (mass ratio), such that the filling ratio is 60% relative to the volume of the mixer, and heating and melting the mixture at a temperature that is higher than the melting point of [C] the polyamide resin by 30° C.

The results are given in Table 1.

Example 1

Production of Reinforcing Fibers (Carbon Fibers))

A bundle of carbon fibers which have not been adhered to a resin composition or the like (manufactured by Mitsubishi Rayon Co., Ltd., trade name: PYROFIL (registered trade mark) TR 50S15L) was immersed in an aqueous dispersion of the sizing solution B, which has been prepared to have solid concentration of 2.0% by mass. After passing through a nip roll, it was dried by contact for 10 seconds with a heating roll prepared to have surface temperature of 140° C. to obtain a bundle of carbon fibers that are adhered to a polyamide resin composition.

(Production of Carbon Fiber Sheet and Prepreg)

The produced carbon fiber bundle was wound using a drum winder and a sheet of unidirectional carbon fibers in which weight per unit area (FAW: mass of unit area) of carbon fiber is 145 g/m² was produced. Meanwhile, the PAN-based carbon fiber 1 was handled in a fiber bundle (tow) state and the number of PAN-based carbon fibers 1 constituting each fiber bundle was 15000.

(Production of Unidirectional Thermoplastic Resin Prepreg)

On both surfaces of a sheet-like product of carbon fibers in which carbon fibers are oriented in one direction (weight per unit area; 145.0 g/m²), Nylon 6 resin film or MXD6 film was laminated to obtain a laminate. The laminate was heated at 255° C. for Nylon 6 or at 270° C. for MXD6. According to melt-impregnation of the thermoplastic resin film in the sheet-like product of carbon fibers, a thermoplastic UD prepreg was obtained. The obtained thermoplastic prepreg has the thickness of 159 μm, the weight per unit area of 145.0 g/m², and the fiber deposition content of 50.0%.

(Molding of Molded Plate (12 Ply) of Unidirectional Carbon Fiber Composite Material)

Twelve pieces of the UD prepreg were laminated such that the fiber axes are in the same direction and the resulting laminate was added to a molding frame. Furthermore, it was placed in a dual-performance press machine for heating and cooling (manufactured by SHINTO Metal Industries Corporation, product name: F-37) of which the heating plate has been heated in advance to 300° C., and it was preheated until the internal mold temperature was 240° C. for Nylon 6 or 260° C. for MXD6. Subsequently, the heating and pressurizing press was performed for 1 minute at pressure of 2 MPa, and then cooling press was performed at pressure of 2 MPa to obtain a molded plate.

(Observation of Cross-section)

The periphery of the obtained molded plate was embedded in polyester resin (manufactured by Kulzer, trade name: Techno bit 4000) and, by polishing any cross-section perpendicular to the fiber axis direction of carbon fibers, a measurement sample was prepared. The measurement sample was observed by using a digital microscope (manufactured by KEYENCE CORPORATION, trade name: VHX-100).

(Void Area Ratio)

The molded body was embedded in polyester resin (manufactured by Kulzer, trade name: Techno bit 4000) and, after polishing any cross-section perpendicular to the fiber axis direction of carbon fibers with a water-resistant paper in order of the number #200, 400, 600, 800, 1000, for 5 minutes for each number, the cross-sectional image was photographed at magnification of 150 times by using a digital microscope (manufactured by KEYENCE CORPORATION, trade name: VHX-100). The area of photographed cross-section and the area of void surface were measured and the ratio of the void area relative to the cross-sectional area was calculated to measure the void area ratio.

(90° Bending Test)

The molded plate of unidirectional carbon fiber composite material which has been obtained from above was cut to a size of length 60 mm (length in 90° direction)×width 12.7 mm (length in 10° direction) by using a wet type diamond cutter to prepare a test specimen. By using a universal tester (manufactured by Instron, trade name: Instron5565) and analysis software (trade name: Bluehill), a three-point bending test was performed for the obtained test specimen according to ASTM D790 (press; R=5.0, L/D=16) and 90° bending strength was calculated.

The results are given in Table 1.

Regarding the overall evaluation, those showing positive results for all of 90° bending property, impregnation ratio, and $N_m/N_0$ evaluation were determined as A, those showing positive results for two of them were determined as B, those showing positive results for only one of them were determined as C, and those showing negative results for all of them were determined as D.

Example 2

The evaluation was performed in the same manner as Example 1 except that the sizing solution C was used as a sizing agent. The results are given in Table 1.

Example 3

The evaluation was performed in the same manner as Example 1 except that the sizing solution B was used as a sizing agent and MXD6 was used as a resin. The results are given in Table 1.

Example 4

The evaluation was performed in the same manner as Example 1 except that the sizing solution C was used as a sizing agent and MXD6 was used as a resin. The results are given in Table 1.

Example 5

A thermoplastic UD prepreg in which Nylon 6 (1013B) was used was obtained by the same production method as Example 1 above. The obtained thermoplastic prepreg has the thickness of 149 μm, the weight per unit area of 125.0 g/m², and the fiber deposition content of 42.0%. The obtained prepreg was cut to a size of 300 mm×300 mm (width×length) and cuts were created at constant interval by using a cutting floater (manufactured by LASERCK CORPORATION, product name: L-2500). At that time, the sheet portion up to 5 mm apart from the end of the sheet was removed and a cutting process was performed at an angle θ=45° between a cut for cutting the fiber and reinforcing fibers such that the reinforcing fibers can have length L of 25.0 mm and average cut depth I equals to 42.4 mm.

(Molding of Laminate Plate)

Sixteen layers of the thermoplastic UD prepreg which have been cut as described above were laminated quasi-isotropically ([0/45/901-45]s2), and the resulting laminate was added to a molding frame. Furthermore, it was placed in a dual-performance press machine for heating and cooling (manufactured by SHINTO Metal Industries Corporation, product name: SFA-50HH0) of which the heating plate has been heated in advance to 300° C., and preheated until the internal mold temperature is 250 C. Subsequently, the heating and pressurizing press was performed for 11 minutes at pressure of 0.3 MPa, and then cooling press was performed at pressure of 1.0 MPa to obtain a molded plate. The bending strength and void area ratio of the obtained molded plate are described in Table 1.

Example 6

The laminated was prepared and the evaluation was performed in the same manner as Example 5 except that MXD6 was used as a resin. The results are given in Table 1.

Comparative Example 1

The evaluation was performed in the same manner as Example 1 except that the sizing solution A was used as a sizing agent and Nylon 6 (1013B) was used as a polyamide resin. The results are given in Table 1.

Comparative Example 2

The evaluation was performed in the same manner as Example 1 except that the sizing solution A was used as a sizing agent and MXD6 was used as a polyamide resin. The results are given in Table 1.

Comparative Example 3

The evaluation was performed in the same manner as Example 1 except that the sizing solution A was used as a sizing agent and Nylon 6 (1022B) was used as a polyamide resin. The results are given in Table 1.

roller type blade at 100 rpm for 15 minutes, an average representing the fluidity of (C) the polyamide resin in cases where a mixer having a volume of 60 cc and a roller type blade is used, only (C) the polyamide resin is filled into the mixer such that filling ratio is 60% relative to the volume of the mixer, and the resin is heated and melted at a temperature that is higher than the melting point of (C) the polyamide resin by 30° C.; and wherein $N_m$, is an average of torques of a roller type blade required for maintaining a number of revolutions of a roller type blade at 100 rpm for 15 minutes, the average representing the fluidity of a mixture which is obtained by using a mixer having a volume of 60 cc and a roller type blade, filling the mixer with a mixture, in which (B) the sizing agent and (C) the polyamide resin are mixed at 3:100 (mass ratio), such that the filling ratio is 60% relative to the volume of the mixer, and heating

TABLE 1

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Sizing agent | Sizing B | Sizing C | Sizing B | Sizing C | Sizing B | Sizing B | Sizing A | Sizing A | Sizing A |
| Polyimide resin | Ny6(1013B) | Ny6(1013B) | MXD6 | MXD6 | Ny6(1013B) | MXD6 | Ny6(1013B) | MXD6 | Ny6(1022B) |
| Prepreg | Unidirectional | Unidirectional | Unidirectional | Unidirectional | Cut | Cut | Unidirectional | Unidirectional | Unidirectional |
| $N_o$ | 1.51 | 1.51 | 2.08 | 2.08 | 1.51 | 1.51 | 1.51 | 2.08 | 3.0 |
| $N_m$ | 1.89 | 2.65 | 2.74 | 3.28 | 1.89 | 1.89 | 12.03 | 13.66 | 12.50 |
| $N_m/N_o$ | 1.25 | 1.75 | 1.32 | 1.58 | 1.25 | 1.25 | 7.97 | 6.57 | 4.17 |
| Bending strength (90°) | 110 | 105 | 80 | 77 | 450 | 620 | 60 | 60 | 40 |
| Void area ratio | 5 | 7 | 7 | 8 | 5 | 7 | 17 | 17 | 20 |
| Overall evaluation | A | A | A | A | A | A | D | D | D |

INDUSTRIAL APPLICABILITY

According to the present invention, a fiber-reinforced thermoplastic resin prepreg which has light weight and excellent strength and rigidity, a molded body obtained by laminating the fiber-reinforced thermoplastic resin prepreg, and a method for producing the fiber-reinforced thermoplastic resin prepreg can be provided, and they are industrially very useful.

The invention claimed is:

1. A method for producing a fiber-reinforced thermoplastic resin prepreg, the method comprising adding (C) a polyamide resin in a melted state to a plurality of (A) reinforcing fibers adhering to (B) a sizing agent and pressurizing at a temperature that is higher than a melting point of (C) the polyamide resin by 10 to 60° C. and at a pressure of 0.1 to 5.0 MPa, wherein
   (A) the reinforcing fibers have a weight per unit area (g/m²) of 50 to 300,
   (C) the polyamide resin is at least one resin selected from the group consisting of Nylon 6, Nylon 12, Nylon 610, Nylon 612 and Nylon MXD6, where the polyamide resin has a melting point of 250° C. or lower, and
   in which (B) the sizing agent and (C) the polyamide resin satisfy the following conditions:

$N_m/N_o \leq 2$ wherein $N_0$ is an average of torques of a roller type blade required for maintaining number of revolutions of a and melting the mixture at a temperature that is higher than the melting point of (C) the polyamide resin by 30° C.

2. A method for producing a molded body comprising the following steps (1) to (4):
   step (1): at least two pieces of the fiber-reinforced thermoplastic resin prepreg prepared according to claim 1 are laminated to obtain a prepreg laminate;
   step (2): the prepreg laminate obtained from the step (1) is preheated at a temperature that is higher than the melting point of (C) the polyamide resin by 10 to 60° C.;
   step (3): the preheated prepreg laminate is heated and pressurized at a temperature that is higher than the melting point of (C) the polyamide resin by 10 to 60° C. and at a pressure of 0.1 to 5.0 MPa; and
   step (4): the heated and pressurized prepreg molded body is cooled and pressurized at 0.1 to 5.0 MPa to obtain a molded body.

3. A fiber-reinforced thermoplastic resin prepreg comprising (A) reinforcing fibers, (B) a sizing agent, and (C) polyamide resin, wherein
   (A) the reinforcing fibers have a weight per unit area (g/m²) of 50 to 300,
   (C) the polyamide resin is at least one resin selected from the group consisting of Nylon 6, Nylon 12, Nylon 610, Nylon 612 and Nylon MXD6, where the polyamide resin has a melting point of 250° C. or lower, and (B) the sizing agent and (C) the polyamide resin satisfy the following conditions:

$N_m/N_0 \leq 2$ wherein $N_0$ is an average of torques of a roller type blade required for maintaining the number of revolutions of a roller type blade at 100 rpm for 15 minutes, the average representing the fluidity of (C) the polyamide resin in cases where a mixer having a volume of 60 cc and a roller type blade is used, only (C) the polyamide resin is filled into the mixer such that the filling ratio is 60% relative to the volume of the mixer, and the resin is heated and melted at a temperature that is higher than the melting point of (C) the polyamide resin by 30° C., wherein $N_m$ is an average of torques of a roller type blade required for maintaining the number of revolutions of a roller type blade at 100 rpm for 15 minutes, the average representing the fluidity of a mixture, which is obtained by using a mixer having a volume of 60 cc and a roller type blade, filling the mixer with a mixture in which (B) the sizing agent and (C) the polyamide resin are mixed at 3:100 (mass ratio), such that the filling ratio is 60% relative to the volume of the mixer, and heating and melting the mixture at a temperature that is higher than the melting point of (C) the polyamide resin by 30° C., and wherein a complex viscosity of (C) the polyamide resin is 30 to 250 Pa-s under the following measurement conditions:

<Measurement conditions>

The complex viscosity measured at a temperature that is higher than the melting point of (C) the polyamide resin by 30° C., an angular frequency of 0.1 rad/s, and a displacement of 20% by dynamic viscoelasticity measurement using a rotary viscometer, in which a parallel plate is used, is defined as melt viscosity.

4. A fiber-reinforced thermoplastic resin prepreg comprising (A) reinforcing fibers, (B) a sizing agent, and (C) polyamide resin, wherein (A) the reinforcing fibers have a weight per unit area (g/m²) of 50 to 300, (C) the polyamide resin is at least one resin selected from the group consisting of Nylon 6, Nylon 12, Nylon 610, Nylon 612 and Nylon MXD6, where the polyamide resin has a melting point of 250° C. or lower, and (B) the sizing agent and (C) the polyamide resin satisfy the following conditions:

$N_m/N_0 \leq 2$ wherein $N_0$ is an average of torques of a roller type blade required for maintaining the number of revolutions of a roller type blade at 100 rpm for 15 minutes, the average representing the fluidity of (C) the polyamide resin in cases where a mixer having a volume of 60 cc and a roller type blade is used, only (C) the polyamide resin is filled into the mixer such that the filling ratio is 60% relative to the volume of the mixer, and the resin is heated and melted at a temperature that is higher than the melting point of (C) the polyamide resin by 30° C., wherein $N_m$, is an average of torques of a roller type blade required for maintaining the number of revolutions of a roller type blade at 100 rpm for 15 minutes, the average representing the fluidity of a mixture, which is obtained by using a mixer having a volume of 60 cc and a roller type blade, filling the mixer with a mixture in which (B) the sizing agent and (C) the polyamide resin are mixed at 3:100 (mass ratio), such that the filling ratio is 60% relative to the volume of the mixer, and heating and melting the mixture at a temperature that is higher than the melting point of (C) the polyamide resin by 30° C., and wherein (B) the sizing agent contains at least one compound selected from the group consisting of a compound (A1) which is represented by the following formula (1) and a compound (B1) which is represented by the following formula (2)

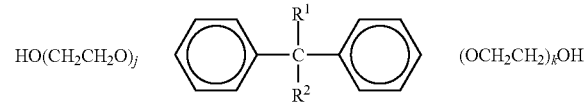

Formula (1)

where for Formula (1), $R^1$ and $R^2$ are each independently a hydrogen atom or an alkyl group, $R^1$ and $R^2$ being the same or different from each other; and j and k are each independently an integer of 1 or higher, provided that the sum of j and k is an integer of 14 to 40;

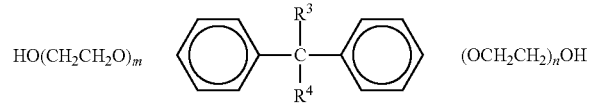

Formula (2)

where for Formula (2), $R^3$ and $R^4$ are each independently a hydrogen atom or an alkyl group, $R^3$ and $R^4$ being the same or different from each other; and m and n are each independently an integer of 1 or higher, provided that the sum of m and n is an integer of 54 to 100, wherein (B) the sizing agent comprises a mixture of the compound (A1) and the compound (B1) and the mass ratio (A1)/(B1) is within a range of from 2/1 to 1/2.

5. A fiber-reinforced thermoplastic resin prepreg comprising (A) reinforcing fibers, (B) a sizing agent, and (C) polyamide resin, wherein (A) the reinforcing fibers have a weight per unit area (g/m²) of 50 to 300, (C) the polyamide resin is at least one resin selected from the group consisting of Nylon 6, Nylon 12, Nylon 610, Nylon 612 and Nylon MXD6, where the polyamide resin has a melting point of 250° C. or lower, and (B) the sizing agent and (C) the polyamide resin satisfy the following conditions:

$N_m/N_0 \leq 2$ wherein $N_0$ is an average of torques of a roller type blade required for maintaining the number of revolutions of a roller type blade at 100 rpm for 15 minutes, the average representing the fluidity of (C) the polyamide resin in cases where a mixer having a volume of 60 cc and a roller type blade is used, only (C) the polyamide resin is filled into the mixer such that the filling ratio is 60% relative to the volume of the mixer, and the resin is heated and melted at a temperature that is higher than the melting point of (C) the polyamide resin by 30° C., wherein $N_m$ is an average of torques of a roller type blade required for maintaining the number of revolutions of a roller type blade at 100 rpm for 15 minutes, the average representing the fluidity of a mixture, which is obtained by using a mixer having a volume of 60 cc and a roller type blade, filling the mixer with a mixture in which (B) the sizing agent and (C) the polyamide resin are mixed at 3:100 (mass ratio), such that the filling ratio is 60% relative to the volume of the mixer, and heating and melting the mixture at a temperature that is higher than the melting point of (C) the polyamide resin by 30° C., and wherein (B) the sizing agent is a sizing agent containing:
a compound (A) which is an ester formed by reaction between an epoxy compound having one or more and three or less epoxy groups in the molecule and an unsaturated monobasic acid and having at least one epoxy group in the molecule;
a urethane acrylate oligomer (B) of a bifunctional type; and
an ester compound (C) which is an ester formed by reaction between an alkylene oxide adduct of bisphenols and a dicarboxylic acid compound and having an acid number of 50 or higher,
the mass ratio of the content of the urethane acrylate oligomer (B) to the compound (A) being within a range of 1/3 to 2/1, and
the content of the ester compound (C) being not more than 2.0 fold by mass greater than the total amount of the compound (A) and the urethane acrylate oligomer (B).

6. A fiber-reinforced thermoplastic resin prepreg comprising (A) reinforcing fibers, (B) a sizing agent, and (C) polyamide resin, wherein
(A) the reinforcing fibers have a weight per unit area (g/m²) of 50 to 300,
(C) the polyamide resin is at least one resin selected from the group consisting of Nylon 6, Nylon 12, Nylon 610, Nylon 612 and Nylon MXD6, where the polyamide resin has a melting point of 250° C. or lower, and
(B) the sizing agent and (C) the polyamide resin satisfy the following conditions:

$N_m/N_0 \leq 2$ wherein $N_0$ is an average of torques of a roller type blade required for maintaining the number of revolutions of a roller type blade at 100 rpm for 15 minutes, the average representing the fluidity of (C) the polyamide resin in cases where a mixer having a volume of 60 cc and a roller type blade is used, only (C) the polyamide resin is filled into the mixer such that the filling ratio is 60% relative to the volume of the mixer, and the resin is heated and melted at a temperature that is higher than the melting point of (C) the polyamide resin by 30° C.,
wherein $N_m$, is an average of torques of a roller type blade required for maintaining the number of revolutions of a roller type blade at 100 rpm for 15 minutes, the average representing the fluidity of a mixture, which is obtained by using a mixer having a volume of 60 cc and a roller type blade, filling the mixer with a mixture in which (B) the sizing agent and (C) the polyamide resin are mixed at 3:100 (mass ratio), such that the filling ratio is 60% relative to the volume of the mixer, and heating and melting the mixture at a temperature that is higher than the melting point of (C) the polyamide resin by 30° C., and
wherein the $N_0$ is 2.08 or lower.

* * * * *